United States Patent [19]

Schwärzler

[11] Patent Number: 5,685,777

[45] Date of Patent: Nov. 11, 1997

[54] CONSTANT VELOCITY UNIVERSAL BALL JOINT

[75] Inventor: Peter Schwärzler, Glattbach, Germany

[73] Assignee: Löhr & Bromkamp GmbH, Offenbach am Main, Germany

[21] Appl. No.: 554,987

[22] Filed: Nov. 13, 1995

[30] Foreign Application Priority Data

Nov. 11, 1994 [DE] Germany ................ 44 40 285.6

[51] Int. Cl.$^6$ ..................... F16D 3/224
[52] U.S. Cl. ..................... 464/145; 464/906
[58] Field of Search ............. 464/142, 134, 464/143, 145, 906; 384/49

[56] References Cited

U.S. PATENT DOCUMENTS

| | | | |
|---|---|---|---|
| 1,551,323 | 8/1925 | Offerdahl | 464/139 X |
| 1,721,060 | 7/1929 | Swartz | 464/142 X |
| 2,480,039 | 8/1949 | Miller | 464/142 |
| 3,362,190 | 1/1968 | Bretschneider et al. | 464/139 |
| 4,012,925 | 3/1977 | Krude | 464/906 X |
| 4,070,872 | 1/1978 | Krude | 464/143 |
| 4,432,741 | 2/1984 | Winkler | 464/145 |

FOREIGN PATENT DOCUMENTS

| | | | |
|---|---|---|---|
| 2671151 | 7/1992 | France . | |
| 870050 | 3/1953 | Germany | 464/143 |
| 1168177 | 4/1964 | Germany . | |
| 2419236A1 | 5/1975 | Germany . | |
| 2461289 | 11/1975 | Germany . | |
| 2461298B1 | 11/1975 | Germany . | |
| 3028467A1 | 3/1982 | Germany . | |
| 5757923 | 4/1982 | Japan . | |
| 62-194029 | 8/1987 | Japan . | |
| 442927 | 4/1992 | Japan . | |
| 5172153 | 7/1993 | Japan | 464/145 |
| 625567 | 4/1994 | Japan . | |
| 244268 | 12/1925 | United Kingdom . | |
| 1243550 | 8/1971 | United Kingdom | 464/145 |
| 2080491 | 2/1982 | United Kingdom . | |

Primary Examiner—Daniel P. Stodola
Assistant Examiner—Eileen A. Dunn
Attorney, Agent, or Firm—Harness, Dickey & Pierce, P.L.C.

[57] ABSTRACT

A fixed constant velocity universal ball joint has an outer joint part with an inner aperture including substantially longitudinally extending outer ball tracks. An inner joint part forms a hub member positioned in the inner aperture of the outer joint part. The inner joint part includes substantially longitudinally extending inner ball tracks. Torque transmitting balls are guided in outer and inner ball tracks associated with one another in pairs. The ball tracks are curved in the longitudinal direction. An annular ball cage is positioned between the outer joint part and inner joint part. The cage includes circumferentially distributed cage windows which hold the balls in a common plane and guide the balls onto an angle bisecting plane when the joint is articulated. The ball tracks are asymmetric in section. The outer track pairs of two adjoining outer ball tracks are formed in the outer joint part. The outer ball tracks extend parallel relative to one another. The inner track pairs of two adjoining inner ball tracks are formed in the inner joint part. The inner ball tracks extend parallel relative to one another. The respective outer and inner track pairs are associated with one another.

7 Claims, 6 Drawing Sheets

CONSTANT VELOCITY UNIVERSAL BALL JOINT

The invention relates to a fixed constant velocity universal ball joint. The fixed joint includes an outer joint part which is to be connected to a first drive part. The outer joint part forms an inner aperture provided with substantially longitudinally extending outer ball tracks. An inner joint part is to be connected to a second drive part. The inner joint part forms a hub member positioned in the inner aperture of the outer joint part. The inner joint part includes substantially longitudinally extending ball tracks. Each of the ball tracks has a center line. Torque transmitting balls are guided in the outer and inner ball tracks which are associated with one another in pairs. The ball tracks are curved in the longitudinal direction. An annular ball cage is arranged between the outer joint part and inner joint part. The cage includes circumferentially distributed cage windows which hold the balls between axial stops in a common plane.

The windows guide the balls onto an angle-bisecting plane between intersecting axes of the outer joint part and inner joint part when the joint is articulated. The cross-section of the ball tracks is asymmetric; the outer and inner ball tracks, associated with one another for accommodating a ball, carry the balls by means of respective track halves positioned circumferentially on opposed sides. Adjoining outer as well as inner ball tracks carry the balls by means of track halves positioned circumferentially on alternating sides.

A joint is known from JP 6-25567. This publication refers to RF fixed joints (Rzeppa) and UF joints (undercut-free).

Both in the inner joint part and outer joint part, the respective fixed joints include meridian tracks whose center lines extend in individual radial planes through the joint axis. The track center lines, which also determine the position of the balls when the joint is in the unloaded condition, are separated from one another by identical pitch angles. However, in each pair of ball tracks in the outer joint part and inner joint part jointly accommodating a ball, in cross-section, one track half, in each case, includes a curvature center which is circumferentially offset relative to the track center line. The respective offset of the track halves of associated tracks in the outer joint part and inner joint part extend in opposed circumferential directions.

Across the circumference of the outer joint and inner joint part, the direction of the offset of the separate curvature centers of the track halves from the track center line alternates from track to track. The effect of joints of this type is, in the case of torque transmission in each direction of rotation, only every second track pair and ball is primarily loaded. This loading takes place through the contact of the ball with the track halves arranged centrically relative to the track center line. The balls are pressure-loaded only by active forces in a line of action extending at an angle of approximately 45° relative to the radial line. The track halves whose curvature centers are offset from the track center line are positioned at a distance from the ball contour so that so-called passive forces acting perpendicularly to the active forces are largely eliminated. By reducing the passive forces, the load conditions at the balls are more advantageous than those of joints where the inside and outside of the track cross-section are symmetric.

The detailed description of the joint design referred to above makes it clear that such universal ball joints are very complicated and expensive to produce. This is due to the fact that individual tracks require at least one additional machining operation to be able to provide the track half with a curvature center which is circumferentially offset relative to the track center line. Thus, each ball track has to be machined individually along a path in an individual radial plane through the joint axis.

SUMMARY OF THE INVENTION

It is therefore an object of the invention to provide a fixed constant velocity universal ball joint where under torque load, the passive forces in the ball tracks are reduced. Also, the joint is to be easier to be produced.

To achieve the objectives, the outer joint part and outer track pairs are formed by two respective adjoining outer ball tracks, the center lines of which extend parallel relative to one another, as well, the inner joint part and inner track pairs are formed by two respective adjoining inner ball tracks, the center lines of which extend parallel relative to one another. The respective outer and inner track pairs are associated with one another. This means that adjoining tracks in the outer joint part and in the inner joint part include center lines which extend parallel relative to one another. In the embodiment as proposed here, it is possible to produce and machine two adjoining ball tracks in the outer joint part and inner joint part, respectively, jointly in one machining operation. This also includes joint production as far as the non-chip producing forming operation is concerned and joint machining in the case of any grinding operations.

In the case of divided tools for the non-chip producing forming operation, two adjoining tracks can be worked by one common tool segment. In the case of chip-forming machining operations, it is possible to use one common forming and grinding tool for two adjoining tracks. In such a case, the total number of balls can be doubled, optionally, by reducing the dimensions of the balls and tracks, without increasing the number of machining stages on the joint. On the other hand, if relatively large balls and track cross-sections are used, it is possible to reduce the total number of balls, for example to four ball pairs.

The advantage of pairs of parallel tracks becomes particularly apparent in the case of fixed joints with curved tracks. In these state of the art joints, such as RF joints, RF 3+3 and UF joints, each meridian track must be individually machined.

In another embodiment, the ball cage includes a common ball window for each two balls guided in ball tracks with parallel center lines. As a result, the number of stamping operations required to produce the cage windows in the ball cage is reduced. Furthermore, by bringing pairs of ball tracks closer together, it may be possible to gain ball cage web width between the respective ball pairs, thereby improving the strength of the ball cage.

In an advantageous embodiment, the ball tracks are designed such that, in their respective cross-sections, they accommodate the active forces at an angle of approximately 45° relative to radial planes through their track centers.

In a first embodiment, the individual ball tracks are substantially symmetric in their respective cross-sections. The angular distances between respective center angles adjoining parallel track center lines of the outer ball tracks in the outer joint part, on the one hand, and the inner ball tracks in the inner joint part, on the other hand, assume different values.

According to a second embodiment, the individual ball tracks are each asymmetric in their respective cross-sections. One track half is deepened relative to the other track with reference to the center line to receive a ball. Circumferentially opposed track halves of associated outer and inner ball tracks are deepened. Also, track halves of adjoining ball tracks, with parallel center lines disposed symmetrically relative to one another, are deepened.

Preferably in both cases, it is the directly adjoining track halves of adjoining ball tracks of the outer track pairs which carry the load. With respect to adjoining ball tracks of the inner track pairs, it is the tracks halves facing away from one another which carry the load. Directly adjoining non-load-carrying track halves of one track pair may be formed by a common deepened groove.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention will be described below with reference to the drawings wherein.

DETAILED DESCRIPTION OF THE DRAWINGS

Figure 1:
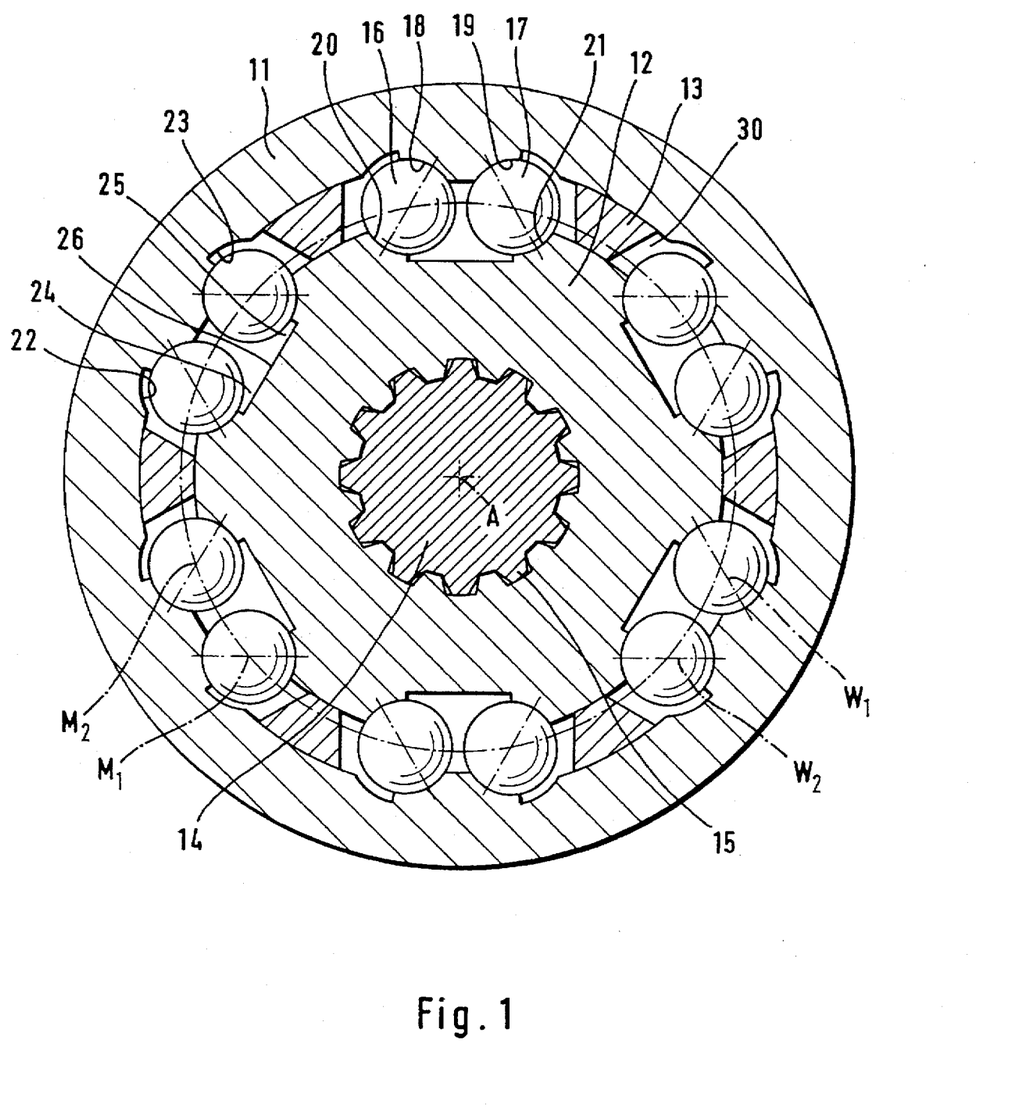
FIG. 1 is a cross-section view of a first embodiment of a universal ball joint of a fixed joint with six ball pairs in accordance with the invention.
Figure 2:
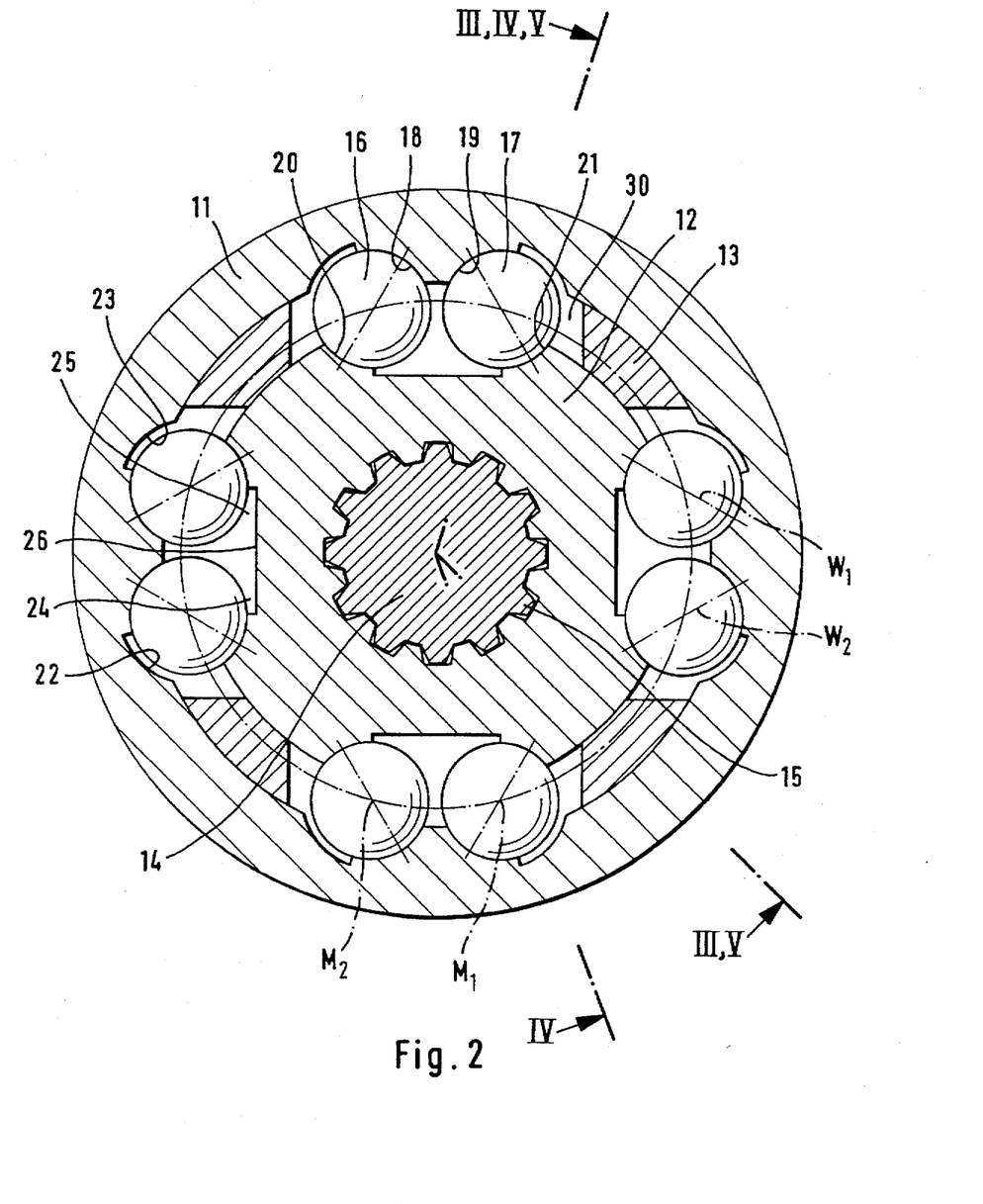
FIG. 2 is a cross-section view of a second embodiment of a universal ball joint of a fixed joint with four ball pairs in accordance with the invention.
Figure 2A:
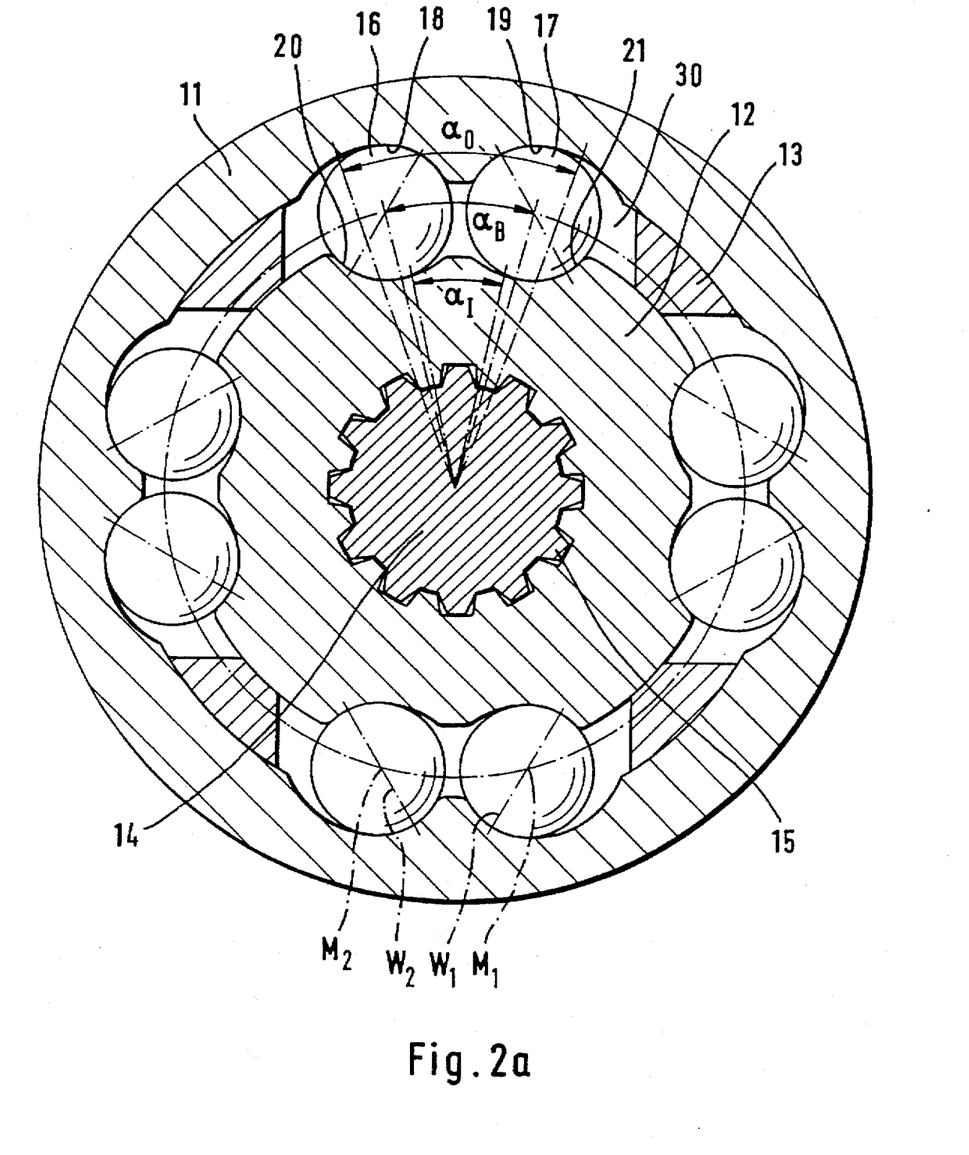
FIG. 2a is a cross-section view of a third embodiment of a universal ball joint of a fixed joint with four ball pairs in accordance with the invention.

FIGS. 1, 2 and 2a each show cross-sections of fixed joints in accordance with the invention with six pairs of balls (FIG. 1) and four pairs of balls (FIGS. 2 and 2a), respectively. In each case, an outer joint part 11, an inner joint part 12 and a ball cage 13 are arranged concentrically relative to one another. A shaft journal 14 is inserted into an axial bore in the inner joint part 12, with the inner joint part 12 and shaft journal 14 non-rotatably connected to one another by a pair of longitudinal teeth 15.

In FIGS. 1, 2, and 2a, six, respectively, four circumferentially distributed pairs of balls 16, 17 are guided in ball tracks 18, 19 of outer track pairs in the outer joint part and in ball tracks 20, 21 of inner track pairs in the inner joint part. For each pair of tracks, the center lines $M_1$, $M_2$, which define the ball tracks, extend parallel relative to one another and at identical distances from the joint axis A, so that in each cross-section through the joint, the distance between the center lines $M_1$, $M_2$ of a track pair of ball tracks is the same. The circumferential distances of the balls 16, 17 of each pair of balls are smaller than the circumferential distances between the balls 16, 17 of different adjoining pairs of balls. This design measure advantageously affects the illustrated embodiment of the ball cage 13 which includes a common cage window 30 for the balls 16, 17 of a pair of balls. The difference between the circumferential distances of the balls relative to one another is advantageous but not essential.

In FIGS. 1 and 2, the ball tracks 18, 19 of an outer pair of tracks in the outer joint part, on one track half in the cross-section, are each provided with widened regions 22, 23 which, with reference to the pair of balls, point outwardly. The ball tracks 20, 21 of an inner pair of tracks in the inner joint part are each provided with extended recesses 24, 25 which, with reference to the pair of balls, are positioned on the inside and are connected to form a common groove 26. By designing the ball tracks this way, only one respective ball of a pair of balls carries an active load in each direction of torque transmission. The active load, in the direction of the lines of action $W_1$, $W_2$, extend at an angle of 45° relative to the radial line. As a result of the widened regions of each track half in the cross-section, the ball remains free from passive forces.

In FIG. 2a, the ball tracks 18, 19 of an outer pair of tracks in the outer joint part are each provided with a symmetrical circular cross-section. Equally, the ball tracks 20, 21 of an inner pair of tracks in the inner joint part are provided with a symmetrical circular cross-section. However, the angular or circumferential distance between the center lines of the outer pairs of tracks characterized by a center angle $\alpha_0$ is greater than the angular or circumferential distance between the center lines of an inner pair of tracks characterized by a center angle $\alpha_1$. By designing the ball tracks this way, only one respective ball of a pair of balls carries an active load in each direction of torque transmission. The active load in the direction of the lines of action $W_1$, $W_2$ extend at an angle of 45° relative to a radial line. As a result, the ball remains free from passive forces. The center angle $\alpha_B$ of a pair of balls is in size between the above-mentioned center angle $\alpha_0$ of the outer pair of tracks and the center angle $\alpha_1$ of the inner pair of tracks.

As the adjoining ball tracks of the track pairs, in principle, also extend parallel relative to one another, with center lines designated $C_{22}$, $C_{24}$, $C_{23}$, $C_{25}$, and as, in consequence, the balls are associated in accordance with the invention in the same way, the balls could also be held in individual separate cage windows of the ball cage 13, without deviating from the subject of the invention.

Figure 3:
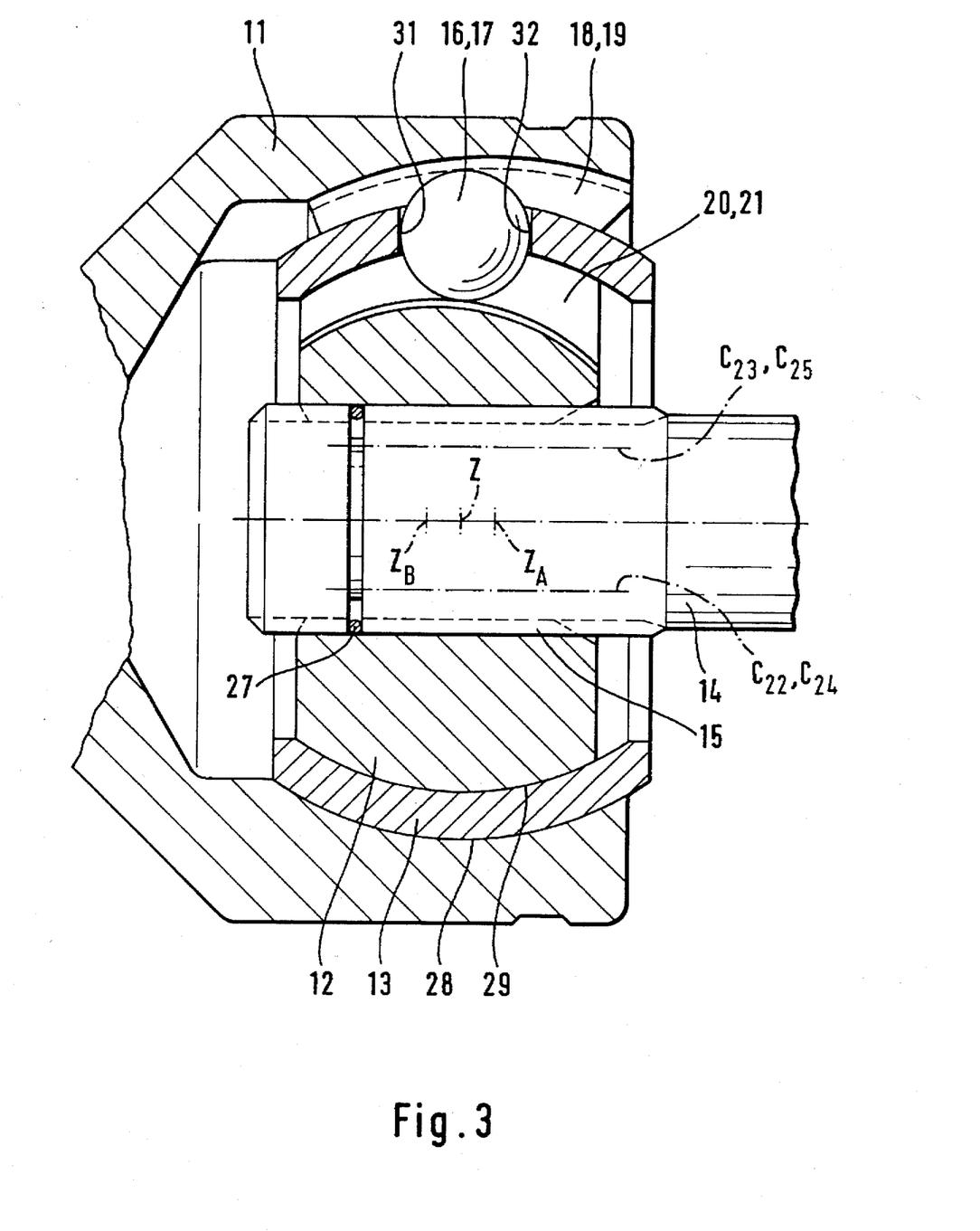
FIG. 3 is a longitudinal section view of a universal ball joint of an RF fixed joint according to FIG. 2.
Figure 4:
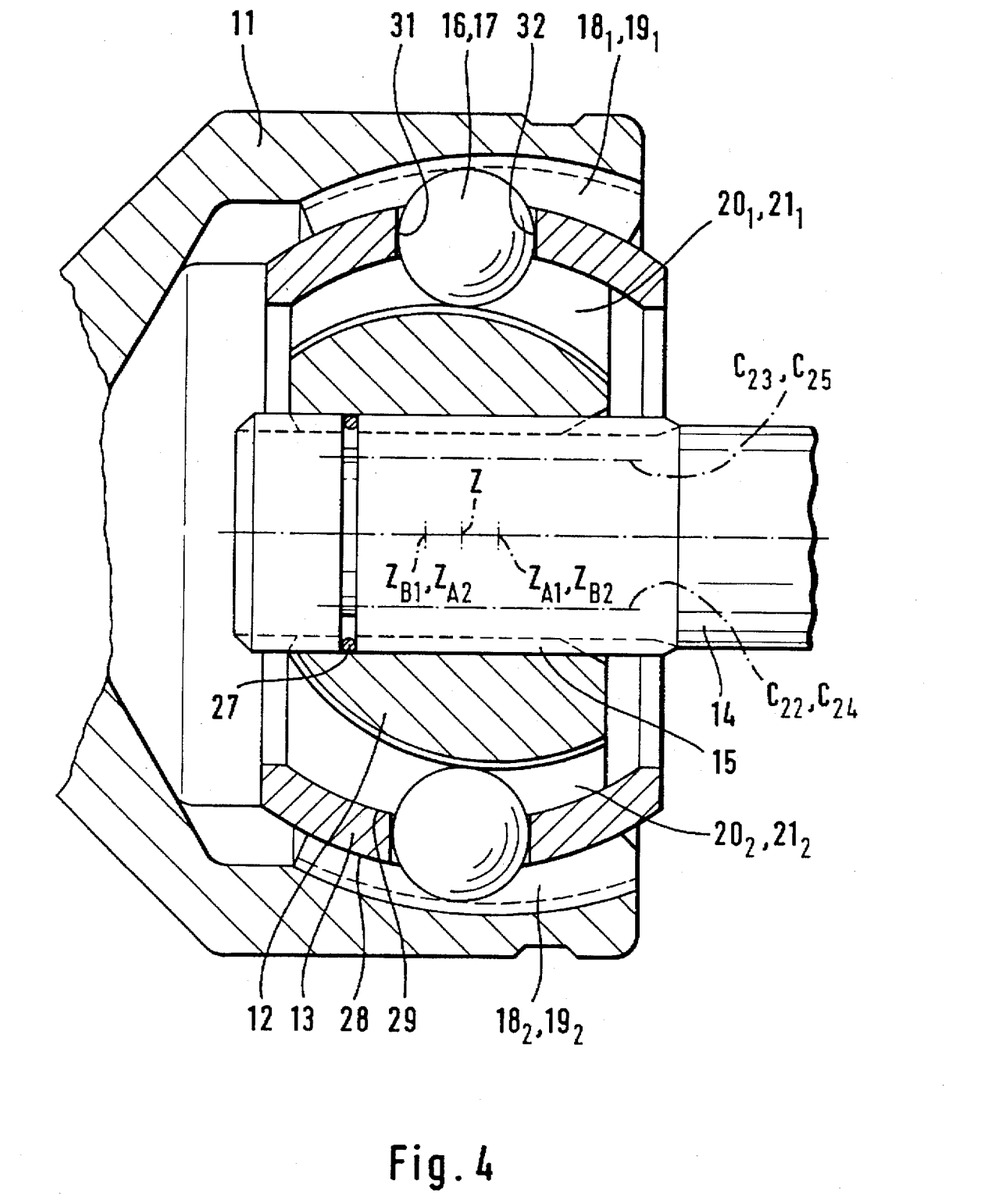
FIG. 4 is a longitudinal section view through a fixed joint of an RF 3+3 joint according to FIG. 2.
Figure 5:
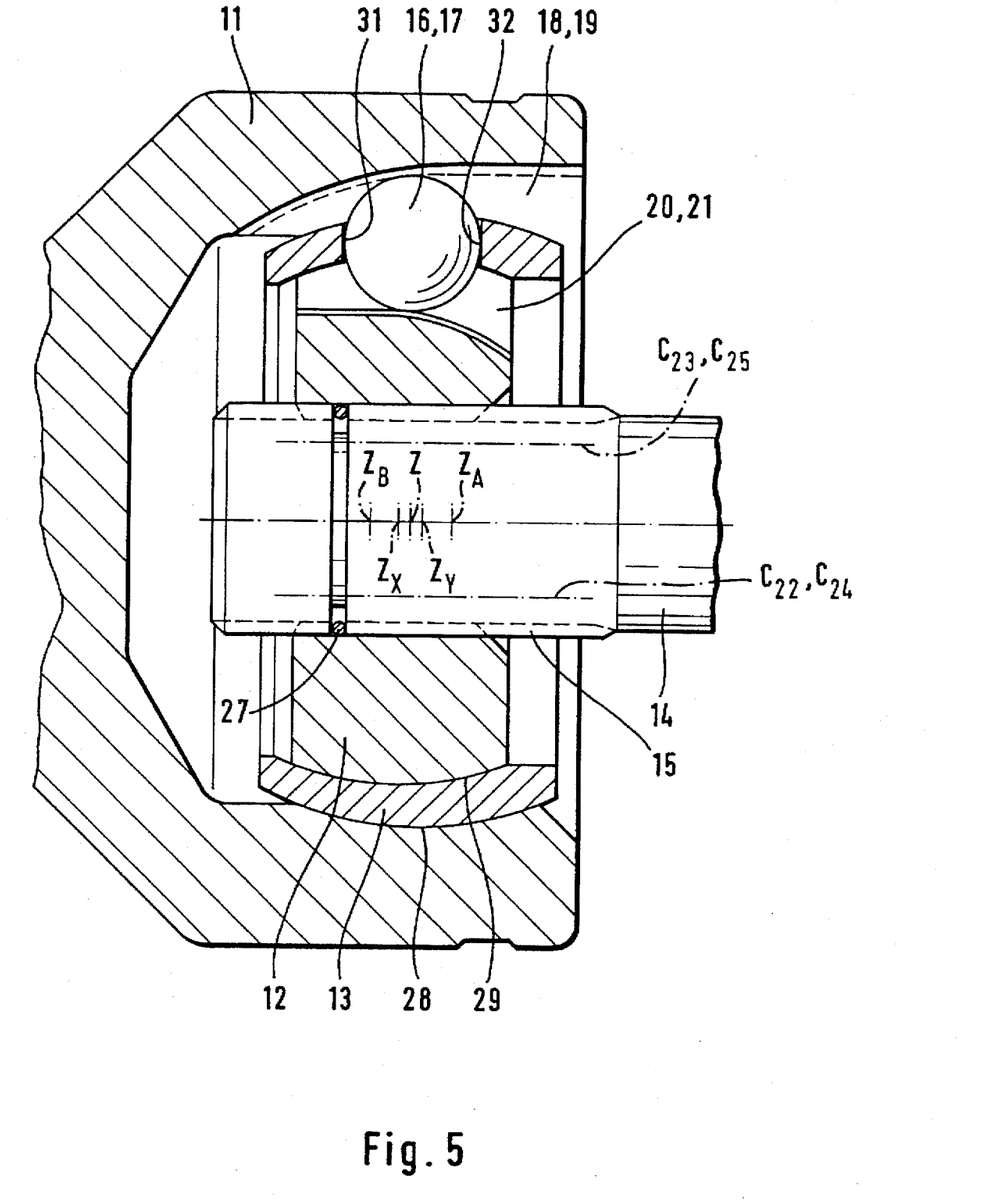
FIG. 5 is a longitudinal section view through a fixed joint of a UF joint according to FIG. 2.

The cross-sections in FIGS. 1, 2 or 2a are equally representative for each of the joints shown in longitudinal sections in FIGS. 3, 4 or 5.

FIGS. 3 to 5 each show a longitudinal section of a joint with an outer joint part 11, an inner joint part 12 and a ball cage 13. The Figures show, how the shaft journal 14 is inserted into the inner joint part 12 and how a pair of shaft teeth 15 establishes a non-rotating connection between the two parts. A securing ring 27 secures the parts axially relative to one another.

In FIGS. 3 and 4, the outer joint part 11 and the ball cage 13 include a pair of spherical faces 28 whose center is located in the joint center Z. Furthermore, the inner joint part 12 and the ball cage 13 include a pair of spherical faces 29 whose center of curvature is also located in the joint center Z. When the joint is articulated, the cage is controlled indirectly by the balls 16, 17. The balls 16, 17, if viewed in a longitudinal section, are positioned in a play-free way in the cage windows between axial stops 31, 32, thus guiding the ball cage 13 on to the angle bisecting plane. The balls 16, 17 are controlled directly by the way in which the ball tracks extend in the outer joint part 11 and inner joint part 12 respectively.

In FIG. 3, the centers of curvature $Z_A$ of the tracks 18, 19 are axially offset in a first direction relative to the joint center Z and the centers of curvature $Z_B$ of the tracks 20, 21 are axially offset in a second direction relative to the joint center Z. The longitudinal section and offset of the centers of curvature as illustrated here apply to all tracks of the joint illustrated.

In FIG. 4, the tracks $18_1$, $19_1$ of the outer joint part 11 and the tracks $20_1$, $21_1$ of the inner joint part 12, as shown in the upper half of the Figure, are fully identical with those according to FIG. 3. Thus, their centers of curvature $Z_{A1}$, $Z_{A2}$ are axially offset in opposite direction relative to the joint center Z, as described. On the other hand, the tracks $18_2$, $19_2$ in the outer joint part 11 and $20_2$, $21_2$ in the inner joint part 12, as shown in the lower half of the Figure, include centers of curvature $Z_{A2}$, $Z_{B2}$ which are offset in opposite directions relative thereto. Thus, in this case, the centers of curvature $Z_{A2}$ of the tracks $18_2$, $19_2$ in the outer joint part 11 are identical with the centers of curvature $Z_{B1}$ and the centers of curvature $Z_{B2}$ of the tracks $20_2$, $21_2$ in the outer joint part 12 are identical with the centers of curvature $Z_{A1}$. Thus, when the joint is articulated, the balls positioned opposite one another in the articulation plane both balls contribute actively towards controlling the cage. Therefore, both balls enter regions of greater track depth. By circumferentially alternating the design of the two track embodiments, one part of the tracks features advantageous control conditions and the other part of the tracks features advantageous torque transmitting conditions.

In FIG. 5, the ball cage 13 and the outer joint part 11 include a first pair of spherical faces 28 whose center $Z_X$ is axially offset in a first direction relative to the joint center Z. The ball cage 13 and the inner joint part 12 include a second pair of spherical faces 29 whose center of curvature $Z_Y$ is axially offset in a second direction relative to the joint center Z. As a result, the cage is subjected to a direct control force when the joint is articulated. The balls 16, 17 are guided onto the angle bisecting plane by the ball cage 13. The balls 16, 17, in the cage windows, if viewed in a longitudinal section, are positioned so as to be play-free between axial stops 31, 32. The tracks 18, 19 in the outer joint part 11 include a first curved region whose center of curvature $Z_A$ is axially-offset relative to the joint center Z. The tracks 18, 19 open towards the open end of the outer joint part 11 in a substantially straight line. The tracks 20, 21 of the inner joint part 12 include a curved region whose center of curvature $Z_B$ is offset in the opposite direction to the center of curvature $Z_A$ relative to the joint center Z. The tracks 20 and 21 continue towards the closed end of the outer joint part 11, also in a straight line.

The design of the joint in accordance with the invention as shown in the longitudinal sections in FIGS. 3, 4 and 5 is identical to joint types as known from the state of the art. In consequence, the control functions are the same as those of prior art RF joints, 3+3 RF joints and UF joints.

While the above detailed description describes the preferred embodiment of the present invention, the invention is susceptible to modification, variation and alteration without deviating from the scope and fair meaning of the subjoined claims.

I claim:

1. A fixed constant velocity universal ball joint comprising:

an outer joint part to be connected to a first drive part, an inner aperture in said outer joint part, said aperture provided with substantially longitudinally extending curved outer ball tracks;

an inner joint part to be connected to a second drive part and which forms a hub member positioned in the inner aperture of the outer joint part, said inner joint part provided with substantially longitudinally extending ball tracks, said outer and inner ball tracks each defining center lines;

torque transmitting balls guided in outer and inner ball tracks associated with one another in pairs, said ball tracks being curved in the longitudinal direction;

planes through said curved center lines dividing the outer and inner ball tracks into track halves respectively;

an annular ball cage arranged between the outer joint part and inner joint part, said cage including circumferentially distributed cage windows which hold said balls between axial stops in a common plane and guide said balls onto an angle-bisecting plane between intersecting axes of the outer joint part and inner joint part when the joint is articulated;

said outer and inner ball tracks, associated with one another for accommodating one of said torque transmitting balls, carry the balls via respective track halves positioned circumferentially on opposed sides of said planes and adjoining outer ball tracks and adjoining inner ball tracks, respectively, carry the balls via track halves positioned on circumferentially alternating sides of said planes, with each pair of outer and inner ball tracks associated with one another for accommodating one of said torque transmitting balls being asymmetric in cross section;

outer track pairs in the outer joint part are formed by two respective adjoining outer ball tracks with their center lines extending parallel relative to one another, and inner track pairs in the inner joint part are formed by two respective adjoining inner ball tracks with their center lines extending parallel relative to one another, with respective outer and inner track pairs being associated with one another.

2. A joint according to claim 1, wherein for each two adjoining balls guided in track pairs associated with one another, the ball cage includes a common cage window.

3. A joint according to claim 1, wherein the ball tracks in their respective cross-sections, carry their loads at an angle of approximately ±45° relative to said planes through their center lines.

4. A joint according to claim 1, wherein the individual ball tracks are substantially symmetric in their respective cross-sections, with the angular distances between the center lines of the ball tracks of the outer track pairs on the one hand and the center lines of the ball tracks of the inner track pairs on the other hand assuming different values.

5. A joint according to claim 1, wherein the individual ball tracks are each asymmetric in their respective cross-sections in that one of said track halves is deeper than the other of said track halves, and in associated outer track pairs on the one hand and inner track pairs on the other hand, circumferentially opposed track halves in an overall symmetric arrangement are deepened.

6. A joint according to claim 5, wherein directly adjoining non-carrying track halves, especially of the ball tracks of the inner track pairs, are formed by a common deepening, connecting said grooves.

7. A joint according to claim 1, wherein with regards to the ball tracks of the outer track pairs, track halves directly adjoining one another carry the load.

* * * * *

UNITED STATES PATENT AND TRADEMARK OFFICE
CERTIFICATE OF CORRECTION

PATENT NO. : 5,685,777
DATED : November 11, 1997
INVENTOR(S) : Peter Schwärzler

It is certified that error appears in the above-identified patent and that said Letters Patent is hereby corrected as shown below:

Column 4, line 7, after "By" delete --.--

Column 4, line 23, delete "$\alpha_1$" and substitute therefor --$\alpha_1$--

Column 4, line 30, delete "$\alpha_1$" and substitute therefor --$\alpha_1$--

Signed and Sealed this

Seventeenth Day of March, 1998

*Attest:*

BRUCE LEHMAN

*Attesting Officer*  *Commissioner of Patents and Trademarks*